(12) United States Patent
Schiegg et al.

(10) Patent No.: US 11,619,568 B2
(45) Date of Patent: Apr. 4, 2023

(54) DEVICE AND METHOD FOR OPERATING A TEST STAND

(71) Applicant: Robert Bosch GmbH, Stuttgart (DE)

(72) Inventors: Martin Schiegg, Korntal-Muenchingen (DE); Sebastian Gerwinn, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 88 days.

(21) Appl. No.: 17/315,919

(22) Filed: May 10, 2021

(65) Prior Publication Data
US 2021/0356362 A1 Nov. 18, 2021

(30) Foreign Application Priority Data
May 12, 2020 (DE) .......................... 102020205964.0

(51) Int. Cl.
*G01M 17/007* (2006.01)
*G06N 20/00* (2019.01)
*G06N 7/00* (2023.01)

(52) U.S. Cl.
CPC .......... *G01M 17/007* (2013.01); *G06N 7/005* (2013.01); *G06N 20/00* (2019.01)

(58) Field of Classification Search
CPC .... G01M 17/007; G01M 15/10; G01M 15/02; G01M 13/00; G06N 7/005; G06N 20/00; G06Q 10/20; G06Q 10/04
See application file for complete search history.

(56) References Cited

FOREIGN PATENT DOCUMENTS

| DE | 102011081346 A1 | 2/2013 | |
|---|---|---|---|
| DE | 102013227183 A1 | 7/2015 | |
| EP | 2846205 A1 | 3/2015 | |
| EP | 2999998 B1 * | 8/2018 | ........... G05B 13/041 |

OTHER PUBLICATIONS

English machine translation of Staldbauer et al. (EP 2999998 B1) (Year: 2018).*
Couto ("Review of input determination techniques for neural network models based on mutual information and genetic algorithms"); Neural Comput & Applic (2009) 18:891-901; DOI 10.1007/s00521-008-0206-2 (Year: 2009).*

* cited by examiner

*Primary Examiner* — Roy Y Yi
*Assistant Examiner* — Geoffrey T Evans
(74) *Attorney, Agent, or Firm* — Norton Rose Fulbright US LLP; Gerard Messina

(57) ABSTRACT

A device and a method for operating a test stand. A set of measurements of input variables of a system model of a component of a machine is provided. An optimization problem is defined using a set of measurements of input variables. A gradient for solving the optimization problem is determined as a function of the set of measurements. A solution to the optimization problem, which defines a design for input data for the test stand for a measurement on the component, is determined as a function of the gradient. A measurement of output data is acquired on the component on the test stand as a function of the input data. Pairs of training input data and training output data are determined as a function of the input data and the measurement of output data. The system model for the component is trained as a function of the pairs.

12 Claims, 2 Drawing Sheets

DEVICE AND METHOD FOR OPERATING A TEST STAND

CROSS REFERENCE

The present application claims the benefit under 35 U.S.C. § 119 of German Patent Application No. DE 102020205964.0 filed on May 12, 2020, which is expressly incorporated herein by reference it its entirety.

BACKGROUND INFORMATION

An approach for operating a test stand utilizing machine learning uses statistical test planning in which a set of input points to be measured is determined from predefined input variables. Measurements for this set of selected input points are carried out on a system. Depending on the output data that are measured in the measurements, a system model is trained by which output data that agree to the greatest degree possible with a real behavior of the system are able to be determined even for input data other than the selected input data.

SUMMARY

Below, a method and a device for operating a test stand of a motor vehicle or of a component of a motor vehicle are provided in accordance with example embodiments of the present invention. These will be described using the example of a test stand for an exhaust aftertreatment system for the motor vehicle. In the examples, an exhaust-gas sensor is used to measure emissions of a motor or of an exhaust aftertreatment of the motor vehicle. Different sensors may be used for other systems of the motor vehicle. Active learning is an approach for machine learning. A regression model is used for training a system model in that approach. In machine learning according to this active learning approach, at least one signal, which represents an input for the motor or an exhaust aftertreatment component on the test stand, is generated in the example. Different inputs can be used for other systems of the motor vehicle. In the example, data about the emissions that are produced when the motor or the components of the exhaust aftertreatment system is/are excited by this input, are measured in an iteration. In the next iteration, these data are used as training data for the regression model. The operation of the test stand includes a multitude of iterations in which particularly suitable inputs are determined. In the process, the at least one signal for the input is generated by a selection of values from a random variable or by determining values by solving an optimization problem. In the following text, the term 'input variable' refers to a signal for a system that is able to be measured such as a rotational speed or a load of a motor. A measurement is a time series of values of an input variable. Multiple measurements of values of the input variable are denoted as a set of measurements of input variables. Multiple input variables are able to be provided. The term 'output variable' denotes a signal for the system which likewise is able to be measured, e.g., an emission of the motor. Multiple measurements of values of the output variable are denoted as a set of measurements of the output variable. In the exemplary system, the output variable changes as a function of the input variable or as a function of the plurality of input variables.

The term 'input data' denotes one or a plurality of allocations (s) of values to input variables. The term 'output data' denotes one or a plurality of allocation(s) of values to output variables. These values are either measured or selected at random. These values are able to be determined by an optimization, which may be set up in a second step on the system and in the process of which associated output variables are able to be measured. The input data may thus be a time series or multiple time series of input variable allocations. For example, a sequence of a rotational speed of a motor and a sequence of a load of the engine are combined in a measurement. A set of measurements encompasses multiple sequences of the rotational speed and multiple sequences of the load, that is to say, a plurality of measurements. An input point is defined by the input variable allocations. An input point may be defined by a measurement or by the set of measurements.

A method and a device according to example embodiments of the present invention make it possible to train a particularly satisfactory system model in an especially efficient manner.

In accordance with an example embodiment of the present invention, the method for operating a test stand provides that a set of measurements of input variables of a system model of at least one component of a machine is provided, an optimization problem is defined as a function of a set of measurements of input variables, a gradient for solving the optimization problem is determined as a function of the set of measurements of input variables, and a solution to the optimization problem, which defines a design for input data for the test stand for a measurement on the at least one component of the machine, is determined as a function of the gradient, a measurement of output data is acquired on the at least one component of the machine on the test stand as a function of the input data, pairs of training input data and training output data are determined as a function of the input data and the measurement of output data, and the system model for the at least one component of the machine is trained as a function of the pairs. The at least one component of the motor vehicle may be a dynamic or a static system. The first measurement of input variables is carried out on the system according to a test plan by which the machine learning of a system model with a focus on certain parts of an input space is able to be carried out. A 'design' describes a measurement still to be performed. The design specifies the input variables that are to be measured in a further measurement on the system. The determination of input variables for the design constitutes a weighted selection of input points from the input space. Training data for training the system model which, for instance, is defined by a Gaussian process, are determined as pairs of the input data determined in this manner and the output data measured on the system on that basis. The solution to the optimization problem provides input data that arise in an operation of the system at a greater probability than other input data. In the training based thereon, the uncertainty that the system model exhibits in relation to the system is reduced for these input data. As a result, the training is able to be carried out in a selective manner in the parts of the input space that are specified by the design.

The system model is preferably trained in iterations, the training in an iteration in particular being conducted exclusively on the basis of pairs of training input data and training output data from iterations that preceded this iteration. This updates the system model with new training data.

The training input data may be defined by a quantity of input data for the at least one component. This allows for efficient training.

The training input data are preferably initialized by an empty quantity or by training input data that are selected, in particular at random, from a set of measurements of input variables. This allows a first iteration to be carried out with a defined state.

The training output data may be defined by a quantity of measurements of output data on the at least one component. This allows for a pairwise allocation to the input data quantity.

The training output data are preferably initialized by an empty quantity or by training output data that are selected, in particular at random, from a set of measurements of output variables. This allows a first iteration to be carried out with a defined state.

In accordance with an example embodiment of the present invention, at least one of the input variables may represent a signal from a sensor, which characterizes a value of an operating variable of the at least one component. Sensor signals are able to be detected especially well. On that basis, an actuation of the system by a corresponding sensor signal is able to be determined as a design for input data for a measurement to be carried out.

The signal preferably is a signal from a camera, a radar sensor, a LIDAR sensor, an ultrasonic sensor, a position sensor, a movement sensor, an exhaust sensor, or an air-mass sensor.

The measurement of output data may define an output variable of the system model which represents an actuation variable, a sensor signal or an operating state for a machine.

Preferably, an actuator of an in particular partially autonomous vehicle or robot is actuated as a function of the actuation variable, the sensor signal and/or the operating state.

At least one input variable for the system model trained in this way is preferably acquired on the at least one component of the machine or on the machine, and at least one variable for the at least one component of the machine is determined as a function of the system model trained in this way, and an operation of the at least one component of the machine or of the machine is monitored as a function of this variable, and/or at least one actuation variable for the component of the machine or for the machine is determined as a function of this variable. The machine preferably is a vehicle.

In accordance with an example embodiment of the present invention, a device for machine learning is developed to carry out the method(s) according to the present invention.

Additional advantageous embodiments result from the following description and the figures.

DETAILED DESCRIPTION OF EXAMPLE EMBODIMENTS

Figure 1:
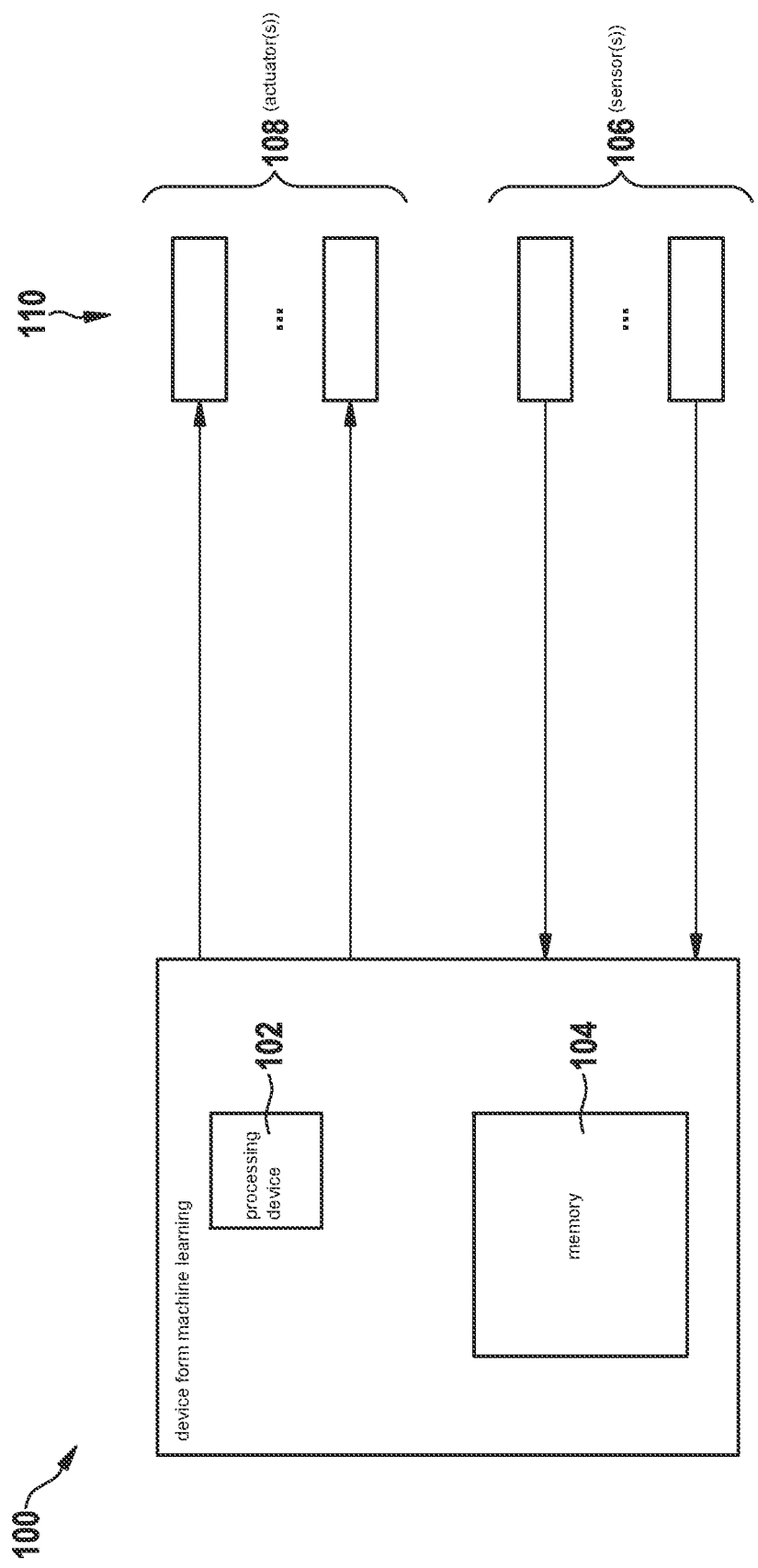
FIG. 1 shows a schematic representation of a system for machine learning, in accordance with an example embodiment of the present invention.

A test stand for at least one component of a motor vehicle is described below. The at least one component of the motor vehicle hereinafter is denoted as a system. The system may be dynamic or static. In one aspect of the present invention, an iterative active learning method—representative active learning—is illustrated in which a multitude of input data points is selected in an iterative manner from possible input data, the system is measured at these input data points in order to obtain output data points which are used for an operation of the test stand and for learning an allocation of input data points to output data points by a system model. The system model in the example is a regression model. In accordance with an example embodiment of the present invention, the provided procedure includes knowledge of an input distribution by which an efficiency of the learning method is improved. In each iteration, an optimum, that is to say, a solution to the optimization problem, represents the most informative input data points and output data points for reducing an uncertainty that exists with regard to an output of the system model in a relevant range of possible input data for the system.

In accordance with an example embodiment of the present invention, the provided procedure includes knowledge about an input distribution by which an efficiency of the learning method is improved. An optimum, i.e., a solution to the optimization problem, in every iteration represents the most informative input data points and output data points for reducing an uncertainty that exists about an output of the system model in a relevant range of possible input data for the system.

In the approach for representative active learning described below in accordance with an example embodiment of the present invention, a quality of the system model is improved in an efficient manner following a measurement of output variables for an initial design of an experiment, and a batch of input data points and output data points is determined in an iterative manner, which are difficult to predict by the current system model on the one hand, and are representative of the estimated distribution of input data points on the other hand. The following method is based on a system model $p(y|x)$ for the system. Input data $x_1, \ldots, x_d$ for the system are characterized by a random variable $X \in \mathbb{R}^d$ having a distribution $p^x$ and a density $p(x)$. For random variable $X$, an output variable $Y \in \mathbb{R}$ of the system model $p(y|x)$ is determined, which characterizes scalar output data $y$ of the system in the example.

In a learning step $t$ of a statistical test plan, a design $D_x^t \in \mathbb{R}^{b \times d}$ is defined as a set of input data $x_1, \ldots, x_b; x_i \in \mathbb{R}^d$ for the system for which a measurement is to be performed in the test. In other words, measurements are to be carried out in the test at the points defined by the set of input data $x_1, \ldots, x_b; x_i \in \mathbb{R}^d$ from all possible points $(D_x^t) \in \mathbb{R}^{b \times d}$ of the system, $b$ being a number of planned measuring points, and $d$ being a dimensionality of the input variables. In learning step $t$, system model $p(y|x)$ defines a probability distribution across hypothetical measurements $D_y^t$ of output data $y$ that are able to be measured in the test, as a function of design $D_x^t$.

FIG. 1 schematically shows a device 100 for machine learning in accordance with an example embodiment of the present invention. Device 100 includes at least one processing device 102 and at least one memory 104. In the example, device 100 is developed to acquire measurements from a signal from at least one sensor 106. The signal in the example characterizes a value of an operating variable of at least one component of a machine, in particular of a motor vehicle. In the example, device 100 is developed to output an actuation variable for at least one actuator 108. The at least one actuator 108 is able to be developed to actuate the at least one component of the machine or some other component of the machine. The signal may characterize some other operating variable, e.g., for an in particular partially autonomous vehicle or a robot. The actuation variable is able to be output in order to actuate the latter.

Sensor 106 can be a camera, a radar sensor, a LIDAR sensor, an ultrasonic sensor, a position sensor, a movement sensor, an exhaust sensor, or an air-mass sensor.

One example of a component of the machine is an exhaust aftertreatment system for a motor vehicle. In one example, an exhaust sensor measures emissions of a motor or an exhaust aftertreatment of the motor vehicle. The system model in this example is a regression model for the exhaust aftertreatment system. A signal, which represents an input for the motor or for an exhaust aftertreatment component for the function check, is generated by the described method. Other inputs may be used for other systems of the motor vehicle. In the example, the emissions produced when the motor or the components of the exhaust aftertreatment system is excited by the input determined by the regression model are measured in an iteration. In the example, these data represent a result of the function check and are used in the next iteration in the example.

Random variable $X \in \mathbb{R}^d$ in the example represents at least one signal from a sensor. The signal may be a signal from the camera, the radar sensor, the LIDAR sensor, the ultrasonic sensor, the position sensor, the movement sensor, the exhaust sensor, or the air mass sensor.

Output variable Y may represent an actuation variable, a sensor signal or an operating state of a machine 110.

For example, at least one actuator 108 is actuated as a function of the actuation variable, the sensor signal, and/or the operating state.

In the test, for instance, a signal for each sensor defined by the set of input data $x_1, \ldots, x_b; x_i \in \mathbb{R}^d$ for the system is measured. In the test, output data y which are to be measured in the test are acquired in the example.

Figure 2:
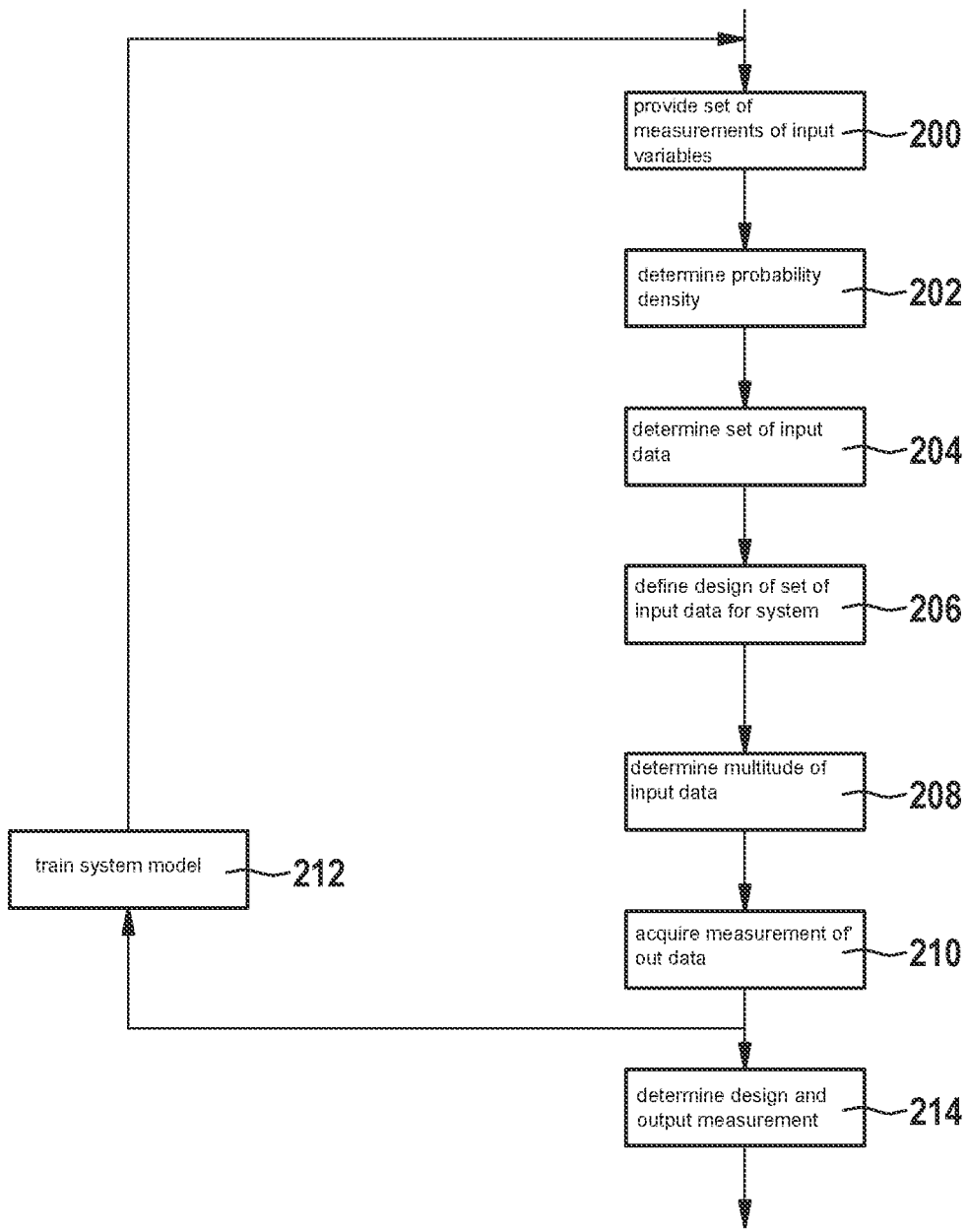
FIG. 2 shows steps in a method for machine learning, in accordance with an example embodiment of the present invention.

Below, a computer-implemented method for machine learning in accordance with an example embodiment of the present invention will be described with reference to FIG. 2.

It may be provided to plan a multitude of tests. In the example, starting from design $D_x^t$, a new design $D_x^{t+1}$ is determined as a function of a measure for a mutual information MI. The measure for mutual information MI is optimized with regard to design $D_x^t$. This measure for mutual item of information MI quantifies the mutual information between input and output of the system. This measure is a function of a hypothetical measurement at points $(D_x^t) \in \mathbb{R}^{b \times d}$.

In learning step t, the measure for mutual information MI is determined as a function of the set of input data $x_1, \ldots, x_b; x_i \in \mathbb{R}^d$ predefined by design $D_x^t$. A measurement could be performed thereon, i.e., measurement $D_y^t$ of output data y be performed. However, as described in the following text, the measure of mutual information MI is determined independently of measurement $D_y^t$ of output data y in learning step t.

This means that the measure for mutual information MI is an objective function that is optimized. This objective function is independent of an actual measurement $D_y^t$. Since measurement $D_y^t$ is not known, an estimation of mutual information MI is considered, which is able to be calculated independently of measurement $D_y^t$. This estimation provides an estimate of mutual information MI between a random input of input data and a corresponding output of output data, under the assumption that a measurement would have been performed for design $D_x^t$, in which context measurement $D_y^t$ would likewise have been measured and both had been taken into account when training a new model of input to output.

In a step 200, a set of measurements of input variables of a system model of at least one component of a machine is provided.

In the example, measurements with input data $x_1, \ldots, x_N$ of random variable $X \in \mathbb{R}^d$ for the system model are provided. 'Provided' means that the input data $x_1, \ldots, x_N$ were already measured, but not associated output data. For example, the rotational speed and load in a vehicle are simply able to be measured while driving. On the other hand, it may be the case that an output variable of interest such as emissions of the vehicle is not measured or is not measured while driving. In this case, the rotational speed and the load are able to be supplied as measurements and it can be calculated on that basis which combination of rotational speed and load as design $D_x^t$ is to be measured on a test stand together with the associated emissions.

In a next step 202, a probability density $\hat{p}_x$ of random variable $X \in \mathbb{R}^d$ is determined as a function of input data $x_1, \ldots, x_N$. The probability density $\hat{p}_x$ is estimated in the example. For instance, this estimate is given by:

$$\hat{p}_x(x) = \frac{1}{N} \sum_i \frac{1}{\sqrt{2\pi h}} \exp\left(-\frac{1}{2}\frac{(x-x_i)^2}{h^2}\right)$$

In this context, h is a bandwidth of a Gaussian kernel and given by the empirical variance of the input data.

In an optional next step 204, it may be provided to determine a set of input data $\{x_i^*\}_{i=1,\ldots,m}$. These may be used as a compact substitute for input data $x_1, \ldots, x_N$.

It may be provided that for random variable X of a quantity of provided input data $\{x_i\}_{i=1,\ldots,N}$, a relatively smaller quantity of input data $\{x_i^*\}_{i=1,\ldots,m}$ is determined which maximizes a measure of the representativeness of these points with regard to the previously determined probability density $\hat{p}_x$. This measure of the representativeness is given by:

$$\sqrt{\left(\frac{1}{m^2}\sum_i \sum_j k_p(x_i^*, x_j^*)\right)}$$

where $$k_p(x, x') = \nabla_x \cdot \nabla_{x'} k(x, x') + \nabla_x k(x, x') \cdot \nabla_{x'} \log \widehat{p_x(x')} +$$
$$\nabla_{x'} k(x, x') \cdot \nabla_x \log \widehat{p_x(x)} + k(x, x') \nabla_x \log \hat{p}_x(x) \cdot \nabla_{x'} \log \hat{p}_x(x')$$

Thus, a quantity of input data $\{x_i^*\}_{i=1,\ldots,m}$ is determined for a selected kernel k. A realization of random variable X represents a measurement $x_i$. Each measurement $x_i$ is a single and possibly multi-dimensional data point. In the example, a set of measurements of input variables, i.e., the quantity of input data $\{x_i\}_{i=1,\ldots,N}$, is jointly used to represent a probability density for random variable X. The quantity of input data $\{x_i\}_{i=1,\ldots,N}$ and the smaller quantity of input data $\{x_i^*\}_{i=1,\ldots,m}$ are data points in each case, but they differ in their numbers. In the example, N data points are provided for the quantity of input data $\{x_i\}_{i=1,\ldots,N}$. M data points are provided for the smaller quantity of input data $\{x_i^*\}_{i=1,\ldots,m}$ in the example, with m<N. Variables that are inserted into kernel $k_p$ or k in the example are denoted by x, x'. This is one possible manner of determining a quantity of input variables so that it is maximally representative of the distribution $\hat{p}_x$. In this context, a representativeness for determining the maximally representative quantity is determined with the aid of a kernel k to be selected.

In a next step 206, the design $D_x^t$, i.e., the set of input data i $x_1, \ldots, x_b; x_i \in \mathbb{R}^d$ for the system that are to be measured in the test, is defined as a function of estimated probability density $\hat{p}_x$.

For a first learning step t=1, it may be provided that as a starting variable, a multitude of input data $\{x_i^*\}_{i=1,\ldots,m}$ for design $D_x^{t=1}$ is pulled independently and with the same distribution from estimated probability density $\hat{p}_x$.

The measure of mutual information MI represents an optimization problem. The optimization problem is defined as a function of design $D_x^t$ and as a function of the set of measurements of input variables.

In step 206, in a learning step t, a gradient $\nabla$MI of the measure of mutual information MI is determined for design $D_x^t$ addition. The gradient is determined for solving the optimization problem as a function of the set of measurements of input variables.

Output variable Y is defined for the system. The measure of mutual information MI in the example is defined as a function of an initially random selection of design $D_x^t$ independently of an associated measurement $D_y^t$ as an approximation for shared information $MI(X;Y)[D_x, D_y]$:

$$MI = \frac{1}{m} \sum_i \log \sum_j \left( \frac{\sigma^2 + \hat{k}_{D_x^t}(x_i^*)}{2\sigma^2 + \hat{k}_{D_x^t}(x_i^*) + \hat{k}_{D_x^t}(x_j^*)} \right)^{\frac{1}{2}} + C$$

with a variance $\hat{k}_{D_x^t}(x)$ $$\hat{k}_{D_x^t}(x) = k_t(x,x) - k_t(x,D_x^t)(k_t(D_x^t,D_x^t) + \sigma^2 \mathbb{I})^{-1} k_t(D_x^t,x)$$

and with a term C, which is not taken into account for the determination of design $D_x^t$, which maximizes the measure of mutual information MI starting from the starting variable for the input data $\{x_i^*\}_{i=1,\ldots,m}$. In the example, the approximation is based on a Gaussian process, which defines a probability measurement of output variable $y_i$ as a function of an input variable $x_i$. This probability measurement is defined via the following Gaussian measurement:

$$p(y_i | x_i) = \frac{1}{\sqrt{\{2\pi(\sigma^2 + k_t(x_i, x_i))\}}} \exp\left(-\frac{(y_i - \mu_t(x_i))^{\wedge}2}{2(\sigma^2 + k_t(x_i, x_i))}\right)$$

In this context, $\mu_t$ is a mean value function and $k_t$ is a covariance function. They are determined anew in every learning step t in the example. Design $D_x^s$ and associated measurement $D_y^s$ from preceding iterations s<t is able to be used for this purpose.

In a subsequent step 208, a multitude of input data $(x_1, \ldots, x_b) = D_x^{t+1}$ for which the measure of mutual information MI satisfies a condition is determined. The condition is predefined by the optimization problem.

In the example, a design $D_x^{t+1}$ for a learning step t+1 following learning step t is determined as a function of the multitude of input data $x_1^*, \ldots, x_m^*$ and also as a function of design $D_x^t$ and independently of measurement $D_y^t$ of learning step t associated with design $D_x^t$.

The input data $\{x_i\}_{i=1,\ldots,b}$ in the example are determined in an optimization with regard to the measurement of input variables X. In the example, the goal of the optimization is:

$$D_x^t = \arg\min_{D_x^t} \frac{1}{m} \sum_i \log \sum_j \left( \frac{\sigma^2 + \hat{k}_{D_x^t}(x_i^*)}{2\sigma^2 + \hat{k}_{D_x^t}(x_i^*) + \hat{k}_{D_x^t}(x_j^*)} \right)^{\frac{1}{2}}$$

An optimization method such as the Broyden-Fletcher-Goldfarb-Shanno, BFGS, method or limited-memory BFGS, LBFGS can be used for solving the optimization problem. On that basis, the new design $D_x^{t+1}$ is determined from this information.

A solution to the optimization problem, which defines a design $D_x^t$ for input data for the test stand for a measurement on the at least one component of the machine, is determined as a function of the gradient. By repeating steps 206 and 208 in a multitude T of consecutive learning steps $t \in T$, a multitude of new designs $D_x^{t+1}$ is determined in the example, which maximizes the measure for mutual information MI as a function of respective input data $\{x_i^*\}_{i=1,\ldots,m}$ and on the basis of the system model p(y|x) trained as a function of the respective previous design $D_x^t$ and associated performed measurements $D_y^t$. This means that measurements $D_y^t$ for design $D_x^t$ are neither carried out nor used for determining this design $D_x^t$. Instead, design $D_x^t$ that is to be used for the next measurement on the system is determined. As described below, system model p(y|x) is trained by input data for the system according to design $D_x^t$ and output data according to measurements $D_y^t$ which were carried out on the system using the input data according to design $D_x^t$. System model p(y|x) trained in this manner is able to be used for subsequent iterations.

In the example, the new design $D_x^{t+1}$ for learning step t+1 following learning step t is determined starting from input data $x_i^*$, i=1, ..., m and previously acquired data $D_x^s, D_y^s$, s≤t with s∈T and as a function of the gradient $\nabla$MI.

In a next step 210, in particular on the test stand, a measurement of output data $y(D_x^{t+1})$ is acquired on the system, especially for the test stand, as a function of input data $D_x^{t+1}$. On the test stand, measurement $D_y^{t+1}$ of output data as a function of the input data according to design $D_x^{t+1}$ is acquired on the at least one component of the machine. In the example, the method for operating the test stand is defined as a function of input data $D_x^t$ and the measurement of output data $y(D_x^t)$. Starting from measurements of input variables of the system, a design for input data $D_x^t$ is determined, with the aid of which measurements of output variables that define the output data $y(D_x^t)$ are to be performed on the system.

The new measurement $D_y^{t+1}$ is determined by a measurement in which the output variable that characterizes output data y is acquired in the test on the system using the set of input data predefined by the new design $D_x^{t+1}$. It may be provided to acquire multiple output variables.

Depending on the input data and measurement $D_y^{t+1}$ of output data y, pairs of training input data and training output data are determined.

The training input data in the example are defined by a quantity of input data for the at least one component.

For a first training step, the training input data are able to be initialized by an empty quantity or by training input data that are selected, in particular at random, from a set of measurements of input variables.

The training output data in the example are defined by measurements of output variables on the training input data on the at least one component.

For a first training step, the training output data are able to be initialized by an empty quantity or by training output data that are selected, in particular at random, from a set of measurements of output variables.

In a step 212, the system model p(y|x) is trained for a learning step t+1 as a function of design $D_x^{t+1}$ and the new measurement $D_y^{t+1}$. Initially, that is to say in the first learning step, a Gaussian process is assumed for system model p(y|x). System model p(y|x) for the at least one component of the machine is trained as a function of the pairs.

It may be provided that system model p(y|x) for the system is trained in particular exclusively by the data of design $D_x^{t=1}, \ldots, D_x^t$ acquired up to that point and the respective measurement $D_y^{t=1}, \ldots, D_y^t$.

In the example, it is provided that random variable $X \in \mathbb{R}^d$ represents signal x of one of sensors 106, and output variable Y represents a scalar actuation variable y for one of actuators 108. Instead of the actuation variable, output variable Y may also represent a virtual sensor signal or an operating state for machine 100.

In this case, system model p(y|x) is trained to output scalar actuation variable y, using training data that represent the signal from sensor 106, for example. With the aid of scalar actuation variable y, actuator 108 is actuated as a function of the sensor signal in the example.

In a step 214, which is carried out after the multitude s of consecutive learning steps, design $D_x^s$ and output measurement $D_y^s$ is determined, which describes the input-output behavior of the system for sensor model p(y|x) in a particularly efficient manner. In this context, 'efficient' refers to a number of measurements and output measurement $D_y^s$ to be performed according to design $D_x^s$ and to the accuracy achieved as a result. The efficiency is measured as a function of the number of measurements required in order to achieve a certain accuracy of the prediction of system model p(y|x) trained by the measurements.

The method may provide that probability density $\hat{p}_x$ be determined as a function of a kernel density estimate. The kernel density estimate, for instance, is carried out using kernel k and training data $x_1, \ldots, x_N$. Kernel k is defined as a function of a predefined predictive variance c of a Gaussian process, which also takes into account already measured designs $D_x^s, s \leq t$ and is based on an initial kernel $k_0$:

$$\hat{p}_x(x) = \frac{1}{N} \sum_i c(x, x_i)$$

$$c(x, x') = k_0(x, x') - k_0(x, (D_x^1, \ldots, D_x^t))$$
$$k_0((D_x^1, \ldots, D_x^t), (D_x^1, \ldots, D_x^t))^{-1} k_0((D_x^1, \ldots, D_x^t), x')$$

This means that the above-described Gaussian kernel is able to be used for the kernel density estimate. This Gaussian kernel is able to be adapted by incorporating the measurements $D_x^s$ carried out up to that point. In other words, a predictive variance of the Gaussian process is used instead of the Gaussian kernel mentioned above.

Using system model p(y|x) trained in this way after T iterations, the actuation variable, the sensor signal, and/or the operating state is/are able to be determined and an actuator of the in particular partially autonomous vehicle or robot be actuated.

Instead of planning a design only once and measuring it, an iterative approach is used by repeating steps 200 to 212. With the aid of this method, the thusly trained system model p(y|x) is more precise than when using only a single design insofar as the training input data and training output data for which the system model p(y|x) for the system is imprecise and which are also relevant at the same time are iteratively added to the training data. The relevance is measured based on the shared information MI of the training input data for the set of measurements of input variables. By solving optimization problem MI, the training input data most suitable for this purpose are determined in an iteration t.

According to a further aspect of the present invention, at least one input variable for the system model trained in this way is acquired on the at least one component of the machine or on the machine, the system model trained in this way being used for operating the component of the machine or the machine. In the example, at least one variable for the at least one component of the machine is determined as a function of the system model trained in this manner.

For example, at least one input variable or different input variables for the system model trained in this way is/are measured on the at least one component, and at least one output variable of the system model is predicted by the system model trained in this way. The at least one variable may be the at least one output variable, or be determined as a function of at least one actuation variable, which in turn is determined as a function of the at least one output variable of the system model trained in this way.

An operation of the at least one component of the machine or of the machine is able to be monitored as a function of this at least one variable. As a result of the monitoring, the machine may detect an error, for instance when a deviation of the variable from an output variable measured during an operation of the component on the component of the machine is detected. It may be provided to shut down the machine if the deviation exceeds a threshold value.

It may be provided to determine at least one actuation variable for the component of the machine or for the machine as a function of this at least one variable. For example, the deviation of one of these variables from a measuring variable measured on the component of the machine during the operation of the component is used for correcting an actuation by an actuation variable, e.g., in a closed-loop control. According to a further aspect, this system model is able to predict at least one output variable for the at least one input variable or for different input variables for the system model trained in this way. It may be provided that a multitude of output variables which defines a multitude of possible actuation variables is predicted. It may be provided that an operating strategy of the machine determines an actuation variable that satisfies a condition as a function of the output variable. It may be provided that a multitude of output variables is determined as a function of the multitude of output variables and an actuation variable is selected from the multitude of actuation variables that satisfies a condition. In the example, the actuation variable for which the multitude of output variables is optimal with regard to a predefined operating behavior of the machine is determined. For example, the actuation variable for the at least one component of the machine is selected for which the machine generates the lowest emissions.

What is claimed is:

1. A method for operating a test stand, the method comprising the following steps:
   providing a set of measurements of input variables of a system model of at least one component of a machine;
   defining an optimization problem as a function of a set of measurements of input variables;

determining a gradient for solving the optimization problem as a function of the set of measurements of input variables;

determining a solution to the optimization problem, which defines a design for input data for the test stand for a measurement on the at least one component of the machine, as a function of the gradient;

acquiring a measurement of output data on the at least one component of the machine on the test stand as a function of the input data;

determining pairs of training input data and training output data as a function of the input data and the measurement of output data; and training the system model for the at least one component of the machine as a function of the pairs;

wherein the measurement of output data defines an output variable of the system model which represents an actuation variable, or a sensor signal or an operating state for the machine; and wherein an actuator of a partially autonomous vehicle or robot is actuated as a function of the actuation variable, and/or the sensor signal, and/or the operating state.

2. The method as recited in claim 1, wherein the system model is trained in iterations, and the training in an iteration of the iterations is conducted, exclusively based on pairs of design and measurement from iterations that preceded the iteration.

3. The method as recited in claim 1, wherein the training input data are defined by a quantity of the input data for the at least one component.

4. The method as recited in claim 3, wherein training input data are initialized by an empty quantity or by training input data that are selected at random from the set of measurements of input variables.

5. The method as recited in claim 1, wherein the training output data are defined by measurements of output variables on the training input data on the at least one component.

6. The method as recited in claim 5, wherein the training output data are initialized by an empty quantity or by training output data that are selected at random from a set of the measurements of output variables.

7. The method as recited in claim 1, wherein at least one of the input variables represents a signal from a sensor that characterizes a value of an operating variable of the at least one component.

8. The method as recited in claim 7, wherein the signal is a signal from a camera, or a radar sensor, or a LIDAR sensor, or an ultrasonic sensor, or a position sensor, or a movement sensor, or an exhaust sensor, or an air-mass sensor.

9. A method for operating a test stand, the method comprising the following steps:
providing a set of measurements of input variables of a system model of at least one component of a machine;
defining an optimization problem as a function of a set of measurements of input variables;
determining a gradient for solving the optimization problem as a function of the set of measurements of input variables;
determining a solution to the optimization problem, which defines a design for input data for the test stand for a measurement on the at least one component of the machine, as a function of the gradient;
acquiring a measurement of output data on the at least one component of the machine on the test stand as a function of the input data;
determining pairs of training input data and training output data as a function of the input data and the measurement of output data; and
training the system model for the at least one component of the machine as a function of the pairs;
wherein at least one input variable for the trained system model trained is acquired on the at least one component of the machine or on the machine, and at least one variable for the at least one component of the machine is determined as a function of the trained system model, and an operation of the at least one component of the machine or of the machine is monitored as a function of the variable, and/or at least one actuation variable for the component of the machine or for the machine is determined as a function of the variable.

10. The method as claim 9, wherein the measurement of output data defines an output variable of the system model which represents an actuation variable, or a sensor signal or an operating state for the machine.

11. A device for machine learning, the device configured to operate a test stand and to:
provide a set of measurements of input variables of a system model of at least one component of a machine;
define an optimization problem as a function of a set of measurements of input variables;
determine a gradient for solving the optimization problem as a function of the set of measurements of input variables;
determine a solution to the optimization problem, which defines a design for input data for the test stand for a measurement on the at least one component of the machine, as a function of the gradient;
acquire a measurement of output data on the at least one component of the machine on the test stand as a function of the input data;
determine pairs of training input data and training output data as a function of the input data and the measurement of output data; and
train the system model for the at least one component of the machine as a function of the pairs;
wherein the measurement of output data defines an output variable of the system model which represents an actuation variable, or a sensor signal or an operating state for the machine; and
wherein an actuator of a partially autonomous vehicle or robot is actuated as a function of the actuation variable, and/or the sensor signal, and/or the operating state.

12. A non-transitory computer-readable medium which is stored a computer program including computer-readable instructions for operating a test stand, the computer program, when executed by a computer, causing the computer to perform the following steps:
providing a set of measurements of input variables of a system model of at least one component of a machine;
defining an optimization problem as a function of a set of measurements of input variables;
determining a gradient for solving the optimization problem as a function of the set of measurements of input variables;
determining a solution to the optimization problem, which defines a design for input data for the test stand for a measurement on the at least one component of the machine, as a function of the gradient;
acquiring a measurement of output data on the at least one component of the machine on the test stand as a function of the input data;

determining pairs of training input data and training output data as a function of the input data and the measurement of output data; and training the system model for the at least one component of the machine as a function of the pairs;

wherein the measurement of output data defines an output variable of the system model which represents an actuation variable, or a sensor signal or an operating state for the machine; and wherein an actuator of a partially autonomous vehicle or robot is actuated as a function of the actuation variable, and/or the sensor signal, and/or the operating state.

\* \* \* \* \*